United States Patent
Fujiuchi et al.

(10) Patent No.: US 8,378,251 B2
(45) Date of Patent: Feb. 19, 2013

(54) TWO-ELECTRODE ARC WELDING DEVICE AND TWO-ELECTRODE ARC WELDING METHOD

(75) Inventors: Hiroki Fujiuchi, Tochigi (JP); Toshiyuki Horimukai, Tochigi (JP); Tetsuya Kodama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 12/983,525

(22) Filed: Jan. 3, 2011

(65) Prior Publication Data

US 2011/0163075 A1 Jul. 7, 2011

(30) Foreign Application Priority Data

Jan. 6, 2010 (JP) ................................ 2010-001062

(51) Int. Cl.
*B23K 10/00* (2006.01)
(52) U.S. Cl. ......... 219/121.45; 219/121.46; 219/121.59; 219/130.1; 219/136; 219/137 PS
(58) Field of Classification Search ............. 219/121.45, 219/121.46, 121.59, 130.1, 136, 137 PS, 219/137 R
See application file for complete search history.

(56) References Cited

FOREIGN PATENT DOCUMENTS

| JP | 59-040547 | 3/1984 |
|---|---|---|
| JP | 59-040547 | 10/1984 |

*Primary Examiner* — Mark Paschall
(74) *Attorney, Agent, or Firm* — Rankin, Hill & Clark LLP (57) ABSTRACT

A two-electrode arc welding device and two-electrode arc welding method are provided for performing welding with improved penetration performance using two non-consumable electrodes. In a two-electrode arc welding device, a power-supply unit outputs a straight-polarity voltage and a reverse-polarity voltage, which has a different electrical potential than the straight-polarity voltage. The straight-polarity voltage output from the power-supply unit is applied to a non-consumable electrode of a straight-polarity arc torch, whereby an arc is formed. The reverse-polarity voltage output from the power-supply unit is applied to a non-consumable electrode of a straight-polarity arc torch, whereby an arc is formed. An arc spacing distance, which is a distance between the ends of both the straight-polarity arc torch and the reverse-polarity arc torch, is set to be at least a minimum distance at which an arc will not occur therebetween (arc spacing critical distance).

14 Claims, 3 Drawing Sheets

TWO-ELECTRODE ARC WELDING DEVICE AND TWO-ELECTRODE ARC WELDING METHOD

CROSS-REFERENCE TO RELATED APPLICATIONS

This application is based on and claims the benefit of priority from Japanese Patent Application No. 2010-001062, filed on 6 Jan. 2010, the content of which is incorporated herein by reference.

BACKGROUND OF THE INVENTION

1. Field of the Invention

The present invention relates a two-electrode arc welding device and a two-electrode arc welding method for performing welding on a welding base metal using two electrodes. More specifically, the present invention relates to a two-electrode arc welding device and a two-electrode arc welding method that can perform welding with improved penetration performance using two non-consumable electrodes.

2. Related Art

Conventionally, an arc welding device (hereinafter referred to as "conventional single arc welding device") has been widely used that is provided with a welding electrical power source having one end connected to the welding base metal and another end connected to one non-consumable electrode (e.g., TIG torch), and performs welding on a welding base metal by causing the one non-consumable electrode (e.g., TIG torch) to move in a predetermined direction in a state in which an arc has been formed between the non-consumable electrode and the welding base metal.

In addition, an arc welding device is disclosed in Japanese Examined Patent Application Publication No. S59-40547 B (hereinafter referred to as "Patent Document 1") that performs welding on a welding base metal by causing one non-consumable electrode and one consumable electrode to travel at substantially the same speed (hereinafter referred to as "arc welding device of Patent Document 1").

SUMMARY OF THE INVENTION

However, the desired penetration performance may not be obtained with the conventional single arc welding device. Herein, penetration performance is represented by the relationship between the penetration depth and the movement speed of the electrode (hereinafter referred to as "welding speed"). In other words, in cases realizing the same penetration depth, the penetration performance is higher with faster welding speeds. Conversely, in cases with the same welding speed, the penetration performance is higher with deeper penetration depth.

As a result, the arc welding device of Patent Document 1 aims at an improvement in the penetration performance by causing the non-consumable electrode to move ahead of the consumable electrode, preheating the welding base metal with the arc formed from the non-consumable electrode.

Meanwhile, it has been desired in recent years to realize an arc welding device that uses two non-consumable electrodes. However, it is difficult to realize an arc welding device using two non-consumable electrodes, even if the technology of Patent Document 1 is adopted without modification. In other words, the consumable electrode of the arc welding device of Patent Document 1 also serves a function of a welding rod and contacts the welding base metal, and thus is normally equivalent to being grounded. As a result, there is no risk of an arc occurring (short circuiting) between the consumable electrode and the non-consumable electrode. Contrary to this, the non-consumable electrode is separated from the welding base metal and is not grounded. Therefore, in a case of structuring an arc welding device using two non-consumable electrodes by replacing the one consumable electrode with a non-consumable electrode in the arc welding device of Patent Document 1, problems arise such as an arc occurring (short circuiting) between the two non-consumable electrodes due to the device not being grounded. Therefore, it is difficult to judge whether an arc welding device using two non-consumable electrodes could be realized if the problems are not solved. However, a technique that can solve the problems has not been found.

It is an object of the present invention to provide a two-electrode arc welding device and a two-electrode arc welding method for performing welding on a welding base material using two electrodes, whereby it is possible to perform welding with improved penetration performance using two non-consumable electrodes.

A two-electrode arc welding device according to the present invention (e.g., the two-electrode arc welding devices 1, 2 and 3 of the embodiments) includes: a power supply (e.g., the power-supply unit 11 of the embodiments) that outputs a straight-polarity voltage and an reverse-polarity voltage having a different electrical potential than the straight-polarity voltage; a straight-polarity non-consumable electrode (e.g., the non-consumable electrode 41 of the straight polarity arc torch 14 of the embodiments) to which the straight-polarity voltage output from the power supply is applied, and causes an arc to form; and a reverse-polarity non-consumable electrode (e.g., the non-consumable electrode 41 of the reverse-polarity arc torch 15 of the embodiments) to which the reverse-polarity voltage output from the power supply is applied, and causes an arc to form, in which the straight-polarity non-consumable electrode and the reverse-polarity non-consumable electrode are disposed to be separated by at least a minimum distance at which an arc will not occur therebetween (e.g., disposed so an arc spacing distance L1 of the embodiments is at least the arc spacing critical distance referred to in the embodiments), and respectively cause an arc to a welding base metal to form.

According to the present invention, the straight-polarity non-consumable electrode and the reverse-polarity non-consumable electrode are disposed to be separated by at least a minimum distance at which an arc will not occur therebetween. This enables the prevention of an arc from occurring, i.e. short circuiting, between the straight-polarity non-consumable electrode and the reverse-polarity non-consumable electrode. As a result, it has become possible to realize two-electrode arc welding using the two of the straight-polarity non-consumable electrode and the reverse-polarity non-consumable electrode.

In addition, compared to a conventional single arc welding device that only has one non-consumable electrode, the electrical resistance with the welding base metal is doubled and the arc voltage raises, a result of which the amount of heat input can be raised for the same current. In other words, the penetration performance can be improved in comparison to a conventional single arc welding device that only has one non-consumable electrode.

Summarizing the above, it is possible to provide a two-electrode arc welding device that can perform welding with improved penetration performance using the two of the straight-polarity non-consumable electrode and the reverse-polarity non-consumable electrode.

In this case, it is preferable for the two-electrode arc welding device to further include an insulating body (e.g., the insulating body 16 or 17 of the embodiments) disposed between the straight-polarity non-consumable electrode and the reverse-polarity non-consumable electrode.

According to the present invention, the insulating body is arranged between the straight-polarity non-consumable electrode and the reverse-polarity non-consumable electrode. With this structure, the arc formed from the straight-polarity non-consumable electrode cannot pass through the insulating body; therefore, this arc would have to take a roundabout path between the insulating body and the welding base metal in order to transition to the reverse-polarity non-consumable electrode. In this case, the distance from the straight-polarity non-consumable electrode to the welding base metal is shorter than such the roundabout path, and thus has better conductivity; therefore, the arc formed from the straight-polarity non-consumable electrode easily transitions to the welding base metal. For exactly the same reason, the arc formed from the reverse-polarity non-consumable electrode also easily transitions to the welding base metal. In other words, since the minimum distance at which an arc will not occur between the straight-polarity non-consumable electrode and the reverse-polarity non-consumable electrode (the arc spacing critical distance referred to in the embodiments) is shortened, the arrangement distance between the straight-polarity non-consumable electrode and the reverse-polarity non-consumable electrode can be shortened in proportion to the distance by which the minimum distance is shortened. As a result, the penetration performance can be further improved.

In this case, it is preferable for a passage (e.g., the gas ejection passage 61 of the embodiment) through which a gas flows and is externally ejected to be formed inside of the insulating body (e.g., the insulating body 17 of the embodiment).

According to the present invention, gas is externally ejected from the insulating body. AS a result, a medium having high conductivity, e.g., a plasma gas used in plasma welding or gas in which the shielding gas used in TIG welding or the like described later is ionized, is prevented from passing between the insulating body and the welding base metal. Therefore, since the minimum distance at which an arc will not occur between the straight-polarity non-consumable electrode and the reverse-polarity non-consumable electrode (the arc spacing critical distance referred to in the embodiments) is further shortened, the arrangement distance between the straight-polarity non-consumable electrode and the reverse-polarity non-consumable electrode can be further shortened in proportion to the distance by which the minimum distance is shortened. In addition, the distance between the surface of the welding base metal and the straight-polarity non-consumable electrode or the reverse-polarity non-consumable electrode (the arc length L2 referred to in the embodiments) can also be further shortened. As a result, the penetration performance can be further improved.

In this case, it is preferable for at least one among the straight-polarity non-consumable electrode and the reverse-polarity non-consumable electrode to be a plasma arc torch.

According to the present invention, since at least one among the straight-polarity non-consumable electrode and the reverse-polarity non-consumable electrode is a plasma arc torch, a plot arc forms. This makes it possible to cause the arc to transition to the welding base metal 21 without having to carry out touch start. Herein, touch start refers to a method for forming an arc used in TIG welding, in which an arc is formed by causing an electrode to short circuit by bring one end thereof into contact with the welding base metal. In addition, the arc from a plasma arc torch has directionality and a narrow base compared to the arc from a TIG torch. Therefore, the distance between the surface of the welding base metal and the straight-polarity non-consumable electrode or the reverse-polarity non-consumable electrode (the arc length L2 referred to in the embodiments) can be shortened in comparison to a case using a TIG torch. This makes it possible for the penetration performance to be improved in comparison to a case using a TIG torch.

in this case, it is preferable for the straight-polarity non-consumable electrode and the reverse-polarity non-consumable electrode to move in a predetermined direction relative to the welding base metal, and be disposed to be aligned substantially in parallel to the predetermined direction.

According to the present invention, the straight-polarity non-consumable electrode and the reverse-polarity non-consumable electrode are disposed to be aligned substantially in parallel to the movement direction (the welding direction referred to in the embodiments). Therefore, when viewing from a predetermined position on the welding base metal, one among the straight-polarity non-consumable electrode and the reverse-polarity non-consumable electrode will lead and pass this position, and then the other one will pass therethrough. It should be noted that the one among that the straight-polarity non-consumable electrode and the reverse-polarity non-consumable electrode will lead and pass this position that is leading is called "leading electrode" and the other one that is trailing is called "trailing electrode". If considered from the perspective of the welding by the trailing electrode, this enables the leading electrode to have a function of preheating the welding base metal and a function of cleaning the welding base metal. As a result, it is possible to improve the penetration performance by the function of preheating the welding base metal being exercised, and by the function of cleaning being exercised, it is possible to prevent gaps by way of the welding of the trailing electrode.

The two-electrode arc welding method of the present invention is a method corresponding to the aforementioned two-electrode arc welding device of the present invention. Therefore, the two-electrode arc welding method of the present invention makes it possible to exert to the same effects as those of the aforementioned two-electrode arc welding device of the present invention.

According to the present invention, the two of the straight-polarity non-consumable electrode and the reverse-polarity non-consumable electrode are disposed to be separated by at least a minimum distance at which an arc will not occur therebetween. This enables the prevention of an arc from occurring, i.e. short circuiting, between the straight-polarity non-consumable electrode and the reverse-polarity non-consumable electrode. As a result, it has become possible to realize two-electrode arc welding using the two of the straight-polarity non-consumable electrode and the reverse-polarity non-consumable electrode. In addition, compared to a conventional single arc welding device that only has one non-consumable electrode, the electrical resistance with the welding base metal is doubled and the arc voltage raises, a result of which the amount of heat input can be raised for the same current. In other words, the penetration performance can be improved in comparison to a conventional single arc welding device that only has one non-consumable electrode. Summarizing the above, it is possible to provide a two-electrode arc welding device that can perform welding with improved penetration performance using the two of the straight-polarity non-consumable electrode and the reverse-polarity non-consumable electrode.

DETAILED DESCRIPTION OF THE INVENTION

Hereinafter, three embodiments will be explained with reference to the drawings as embodiments of the present invention. It should be noted that each of these three embodiments are referred to hereinafter as "first embodiment", "second embodiment", and "third embodiment", respectively.

First Embodiment

Figure 1:
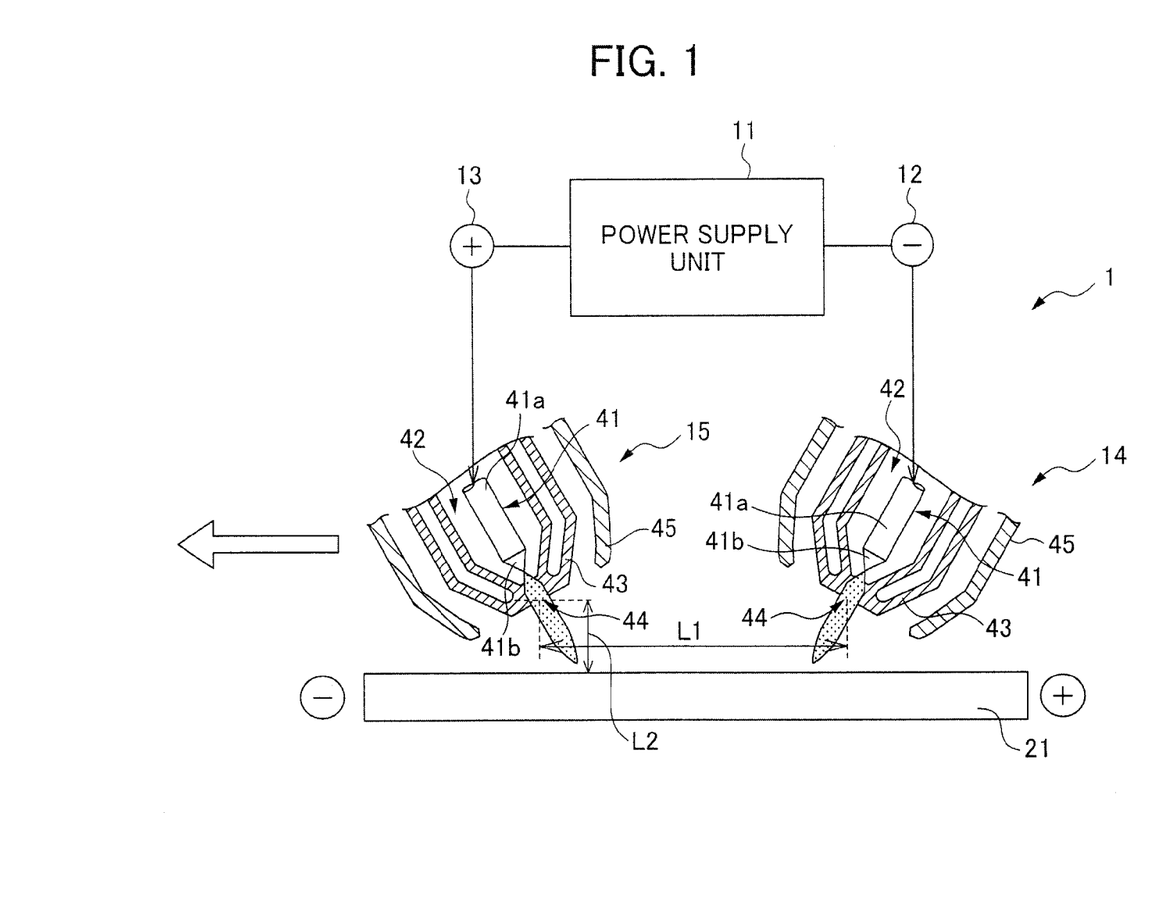
FIG. 1 is a cross-sectional view showing an outline structure of a two-electrode arc welding device according to a first embodiment of the present invention.

FIG. 1 is a cross-sectional view showing an outline structure of a two-electrode arc welding device 1 according to the first embodiment of the present invention.

The two-electrode arc welding device 1 includes a power-supply unit 11, a straight-polarity output terminal 12, a reverse-polarity output terminal 13, a straight-polarity arc torch 14, and a reverse polarity arc torch 15. It should be noted that, for simplicity of explanation, only the end portions in the vicinity of the restricting nozzles are drawn in FIG. 1 for the straight-polarity arc torch 14 and the reverse-polarity arc torch 15. Illustrations for portions other than this have been simplified. Such simplifications of the illustrations have similarly been made in FIGS. 2 and 3, which are described later.

The power-supply unit 11 functions as a welding power source of the two-electrode arc welding device 1. The power-supply unit 11 outputs from the straight-polarity output terminal 12 a voltage (hereinafter referred to as "straight-polarity voltage") that is low voltage to a welding base metal 21, and outputs from the reverse-polarity output terminal 13 a voltage (hereinafter referred to as "reverse-polarity voltage") that is a different electric potential than the straight-polarity voltage and is high voltage to the welding base metal 21. The straight-polarity voltage output from the straight-polarity output terminal 12 is applied to the straight-polarity arc torch 14, thereby causing an arc to form by the voltage (hereinafter referred to as "arc voltage") generated between the tip of the straight-polarity output terminal 12 and the welding base metal 21. The reverse-polarity voltage output from the reverse-polarity output terminal 13 is applied to the reverse-polarity arc torch 15, thereby causing an arc to form by the arc voltage arising between the tip of the reverse-polarity arc torch 15 and the welding base metal 21.

The straight-polarity arc torch 14 and the reverse-polarity arc torch 15 perform welding on the welding base metal 21 while moving in a predetermined direction (which is the white arrow direction in the example of FIG. 1; hereinafter referred to as "welding direction") at substantially the same speed by way of a drive mechanism that is not illustrated.

In the present embodiment, both the straight-polarity arc torch 14 and the reverse-polarity arc torch 15 are designed as plasma arc torches. As a result, the straight-polarity arc torch 14 and the reverse-polarity arc torch 15 respectively include a non-consumable electrode 41, a gas supply part 42, a water-cooled nozzle 43, a nozzle hole 44, and a shield cap 45.

The non-consumable electrodes 41 are respectively arranged at the center inside the straight-polarity arc torch 14 and the reverse-polarity arc torch 15. Each non-consumable electrode 41 includes an electrode rod 41a that is connected to the straight-polarity output terminal 12 or the reverse-polarity output terminal 13, and an electrode tip 41b. The gas supply part 42 to which pilot gas is supplied is formed in the outer circumferential space around the non-consumable electrode 41. A water-cooled nozzle 43 is provided at the outer circumference of the gas supply part 42. A space (white region inside the hatching indicates the water-cooled nozzle 43 in FIG. 1) through which coolant flows is formed inside of the water-cooled nozzle 43. In addition, a nozzle hole 44, which penetrates from the external space on the side of the welding base metal 21 to the internal space that is the gas supply part 42, is formed in the water-cooled nozzle 43.

Herein, the distance L1 indicates the distance from the center of the nozzle 44 (hereinafter referred to as "nozzle end") of the straight-polarity arc torch 14 to the nozzle end of the reverse-polarity arc torch 15, as shown in FIG. 1. Such a distance L1 is hereinafter referred to as "arc spacing distance L1". In addition, a distance L2 indicates the distance from the nozzle end of the straight-polarity arc torch 14 or the reverse-polarity arc torch 15 to the surface of the welding base metal 21, which is flat prior to welding. Such a distance L2 is hereinafter referred to as "arc length L2".

If the arc spacing distance L1 is short, an arc may occur, i.e. may short circuit, between the electrode tip 41b of the straight-polarity arc torch 14 and the electrode tip 41b of the reverse-polarity arc torch 15. It should be noted that an arc occurring between the electrode tip 41b of the straight-polarity arc torch 14 and the electrode tip 41b of the reverse-polarity arc torch 15 is hereinafter referred to as "straight-reverse interelectrode arc". Herein, the minimum distance for a straight-reverse interelectrode arc not to occur (not to short circuit) is hereinafter referred to as "arc spacing critical distance". Therefore, in the first embodiment, the straight-polarity arc torch 14 and the reverse-polarity arc torch 15 are disposed to be aligned substantially in parallel with the welding direction so that the arc spacing distance L1 is at least the arc spacing critical distance.

Next, operation of the above two-electrode arc welding device 1 will be explained.

Focusing on the straight-polarity arc torch 14, if the straight-polarity voltage output from the power-supply unit 11 is applied to the electrode rod 41a via the straight-polarity output terminal 12 and voltage of reverse-polarity is applied to the water-cooled nozzle 43 by way of a pilot arc power supply that is not illustrated, a low current pilot arc will be formed between the electrode tip 41b and the water-cooled nozzle 43 in the vicinity of the nozzle hole 44. In this state, when the pilot gas is supplied to the gas supply part 42, which is the outer circumferential space around the non-consumable electrode 41, a plasma arc forms between the electrode tip 41b and the welding base metal 21 via the nozzle hole 44. Specifically, the plasma arc forms due to this pilot gas being heated by the arc heat and expanding, and then jetting from the nozzle hole 44 at high velocity.

A plasma arc forms at the reverse polarity arc torch 15 by exactly the same principle. Since the arc spacing distance L1 is at least the arc spacing critical distance in this case, as described previously, a straight-reverse interelectrode arc does rot occur. In other words, a plasma arc forms between the reverse-polarity arc torch 15 and the welding base metal 21 simultaneously with a plasma arc forming between the straight-polarity arc torch 14 and the welding base metal 21, as shown in FIG. 1.

While maintaining this state, the straight-polarity arc torch 14 and the reverse-polarity arc torch 15 move in the welding direction at approximately the same speed by way of the drive mechanism, which is not illustrated. At this time, shielding gas supplied to the space between the shield cap 45 and the water-cooled nozzle 43 of both the straight-polarity arc torch 14 and the reverse-polarity arc torch 15 is ejected onto the welding base metal 21. The plasma arc and the welding base metal 21 are isolated (shielded) from air by this shielding gas, and then welding is performed on the welding base metal 21. It should be noted that argon, helium, a mixed gas of these, or the like can be used as this shielding gas. It should also be noted that, during this time, the straight-polarity arc torch 14 and the reverse-polarity arc torch 15 are cooled by the coolant flowing inside each of the water-cooled nozzles 43.

The following effects can be expected from the first embodiment.

(1) The straight-polarity arc torch 14 and the reverse-polarity arc torch 15 are arranged so that the arc spacing distance L1 is at least the arc spacing critical distance. This makes it possible to prevent a straight-reverse interelectrode arc from occurring. As a result thereof, two-electrode arc welding can be realized using two of the non-consumable electrodes 41.

(2) A total of two of the non-consumable electrodes 41 are provided: one to the straight-polarity arc torch 14 and one to the reverse-polarity arc torch 15. As a result, compared to a conventional single arc welding device that only has one non-consumable electrode, the electrical resistance with the welding base metal 21 is doubled and the arc voltage rises, a result of which the amount of heat input can be raised for the same current. In other words, the penetration performance can be improved in comparison to a conventional single arc welding device that only has one non-consumable electrode. It should be noted that, if focusing on electrical resistance itself, it is possible to double the electrical resistance by doubling the length of the one non-consumable electrode also for a conventional single arc welding device. However, in this case, the arc will spread out, thereby offsetting the effect of the amount of heat input rising, i.e. the effect of the penetration performance improving, brought about by doubling the electrical resistance.

(3) Together with the above effects of (1) and (2), it is possible to provide a two-electrode arc welding device and a two-electrode arc welding method that can perform welding with improved penetration performance using two of the non-consumable electrodes 41.

(4) The straight-polarity arc torch 14 and the reverse-polarity arc torch 15 are arranged to be aligned substantially in parallel to the welding direction. Therefore, when viewing from a predetermined position on the welding base metal 21, the reverse-polarity arc torch 15 will first pass this position, and then the straight-polarity arc torch 14 will pass therethrough. If considered from the perspective of the welding by the reverse-polarity arc torch 15, this enables the straight polarity arc torch 14 to have a function of preheating the welding base metal 21 and a function of cleaning the welding base metal 21. As a result, it is possible to improve the penetration performance by the function of preheating the welding base metal 21 being exercised, and by the function of cleaning being exercised, it is possible to prevent gaps by way of the welding of the trailing straight-polarity arc torch 14.

(5) Both the straight-polarity arc torch 14 and the reverse-polarity arc torch 15 are designed as plasma arc torches. This makes it possible to cause the arc to transition to the welding base metal 21 without having to carry out touch start, since pilot arcs form. In addition, since the arc from a plasma arc torch has directionality and a narrow base compared to the arc from a TIG torch, the arc length L2 can be shortened in comparison to a case of using a TIG torch. Accordingly, the penetration depth becomes deeper in proportion to the arc length L2 becoming shorter, and thus the penetration performance improves further.

Second Embodiment

Herein, for the distance between the electrode tip 41b of the straight-polarity arc torch 14 and the electrode tip 41b of the reverse-polarity arc torch 15, there exists a minimum distance necessary to cause the reverse-polarity arc torch 15 that is leading to exhibit the function of preheating the welding base metal 21 and to raise the penetration depth to a desired depth. Hereinafter, such a distance is referred to as "penetration depth raising distance". It is often the case that such a penetration depth raising distance becomes shorter than the arc spacing critical distance under the conditions of the first embodiment. In such a case, the arc spacing distance L1 of the first embodiment is set to be at least the arc spacing critical distance under the conditions of the first embodiment, and thus exceeds the penetration depth raising distance. Therefore, in the two-electrode arc welding device 1 according to the first embodiment, the function of preheating the welding base metal 21 may not be able to be sufficiently exhibited by the reverse-polarity arc torch 15, which is leading. Consequently, a two-electrode arc welding device 2 according to a second embodiment of the present invention has the structure shown in FIG. 2, in which the arc spacing distance L1 is set to be no more than the penetration depth raising distance in order for the function of preheating the welding base metal 21 of the reverse-polarity arc torch 15 that is leading to be sufficiently exhibited.

Figure 2:
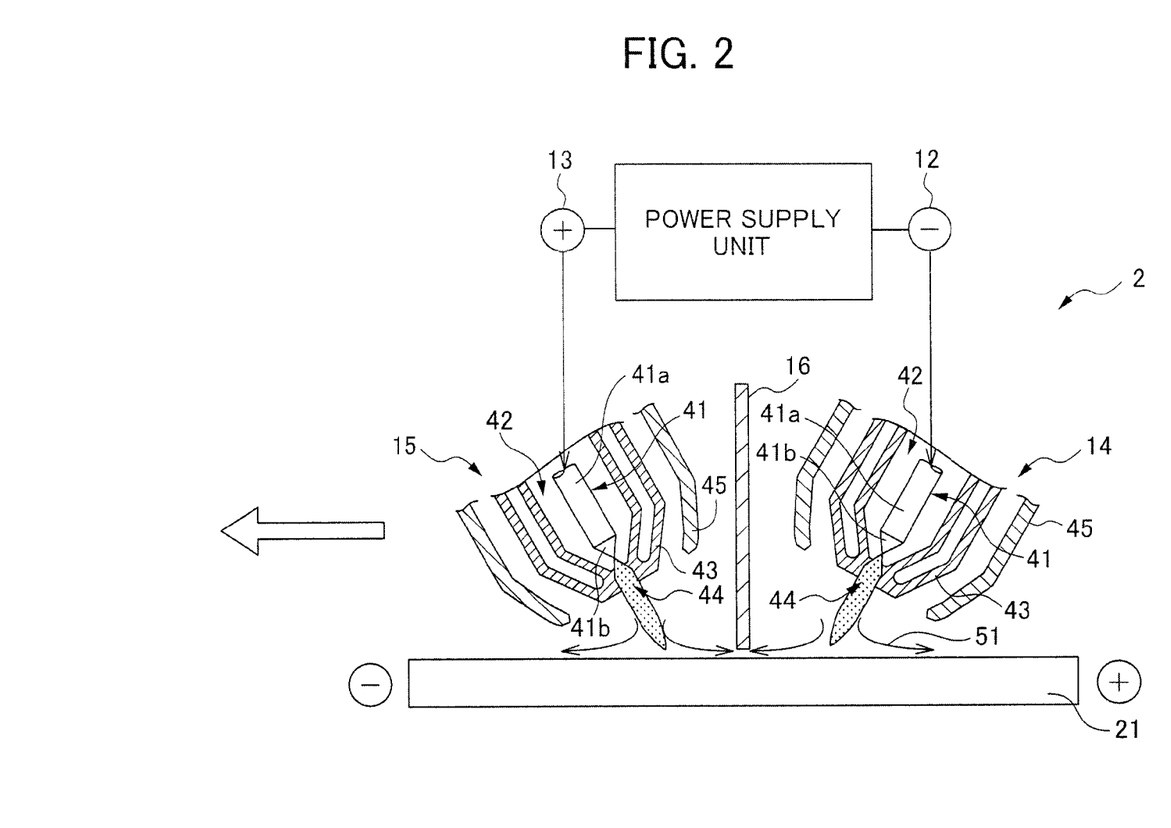
FIG. 2 is a cross-sectional view showing an outline structure of a two-electrode arc welding device according to a second embodiment of the present invention.

Specifically, FIG. 2 is a cross-sectional view showing the outline structure of the two-electrode arc welding device 2 according to the second embodiment of the present invention. It should be noted that, in FIG. 2, corresponding reference symbols are assigned to parts corresponding with FIG. 1, and explanations of these parts have been omitted as appropriate.

The two-electrode arc welding device 2 according to the second embodiment includes the power-supply unit 11, the straight-polarity output terminal 12, the reverse-polarity output terminal 13, the straight-polarity arc torch 14, and the reverse-polarity arc torch 15, similarly to the first embodiment. The two-electrode arc welding device 2 according to the second embodiment further has an insulating body 16 that is arranged between the electrode tip 41b of the straight-polarity arc torch 14 and the electrode tip 41b of the reverse-polarity arc torch 15 to be substantially parallel to a perpendicular line from the surface of the welding base metal 21.

It should be noted that operation of the two-electrode arc welding device 2 according to the second embodiment is fundamentally the same as operation according to the first embodiment; therefore, explanation thereof will be omitted.

As a matter of course, there are the aforementioned effects (3) to (5), as well as the following effect according to the second embodiment.

(6) The insulating body 16 is arranged between the electrode tip 41b of the straight-polarity arc torch 14 and the electrode tip 41b of the reverse-polarity arc torch 15. With this structure, the arc formed from the electrode tip 41b of the straight-polarity arc torch 14 cannot pass through the insulating body 16; therefore, this arc would have to take a roundabout path between the insulating body 16 and the welding base metal 21 in order to transition to the electrode tip 41b of the reverse-polarity arc torch 15. In this case, the distance from the electrode tip 41b of the straight-polarity arc torch 14 to the welding base metal 21 is shorter than such a roundabout path, and thus has better conductivity; therefore, the arc formed from the electrode tip 41b of the straight-polarity arc torch 14 easily transitions to the welding base metal 21. For exactly the same reason, the arc formed from the electrode tip 41b of the reverse-polarity arc torch 15 also easily transitions to the welding base metal 21. In other words, the arc spacing critical distance in the second embodiment is shortened in comparison to the case of the first embodiment (refer to FIG. 1) in which the insulating body 16 is not installed, and is no more than the penetration depth raising distance. Therefore, even if the arc spacing distance L1 in the second embodiment is shortened to no more than the penetration depth raising distance, it is possible to maintain the arc spacing critical distance. As a result thereof, the penetration performance improves since the function of preheating the welding base metal 21 of the reverse-polarity arc torch 15 that leads is sufficiently exhibited.

Third Embodiment

As explained above, the arc spacing distance L1 of the second embodiment can be shortened more than the arc spacing distance L1 of the first embodiment, and the preheating function of the reverse polarity arc torch 15 that leads can be further exhibited in proportion to the distance by which L1 is shortened. However, as shown in FIG. 2, by ejecting the pilot gas supplied to the gas supply part 42 from the nozzle hole 44 (hereinafter referred to as "plasma gas 51"), the gas 51 that became a plasma (or easily becomes a plasma) easily inundates the surface of the welding base metal 21. As a result, the plasma gas 51 may pass between the insulating body 16 and the welding base metal 21. In such a case, a straight-reverse interelectrode arc may form due to the plasma gas 51 having high conductivity. Therefore, in the second embodiment, it is necessary to lower the flow-rate of the pilot gas that is the source of the plasma gas 51 so that there is no possibility for a straight-reverse interelectrode arc to form. However, a decline in the flow-rate of the pilot gas invites for degraded penetration performance. Consequently, a two-electrode arc welding device 3 according to a third embodiment of the present invention has the structure shown in FIG. 3, in which the flow-rate of the pilot gas is maintained and the pilot gas 51 is prevented from passing between the insulating body 16 and the welding base metal 21.

Figure 3:
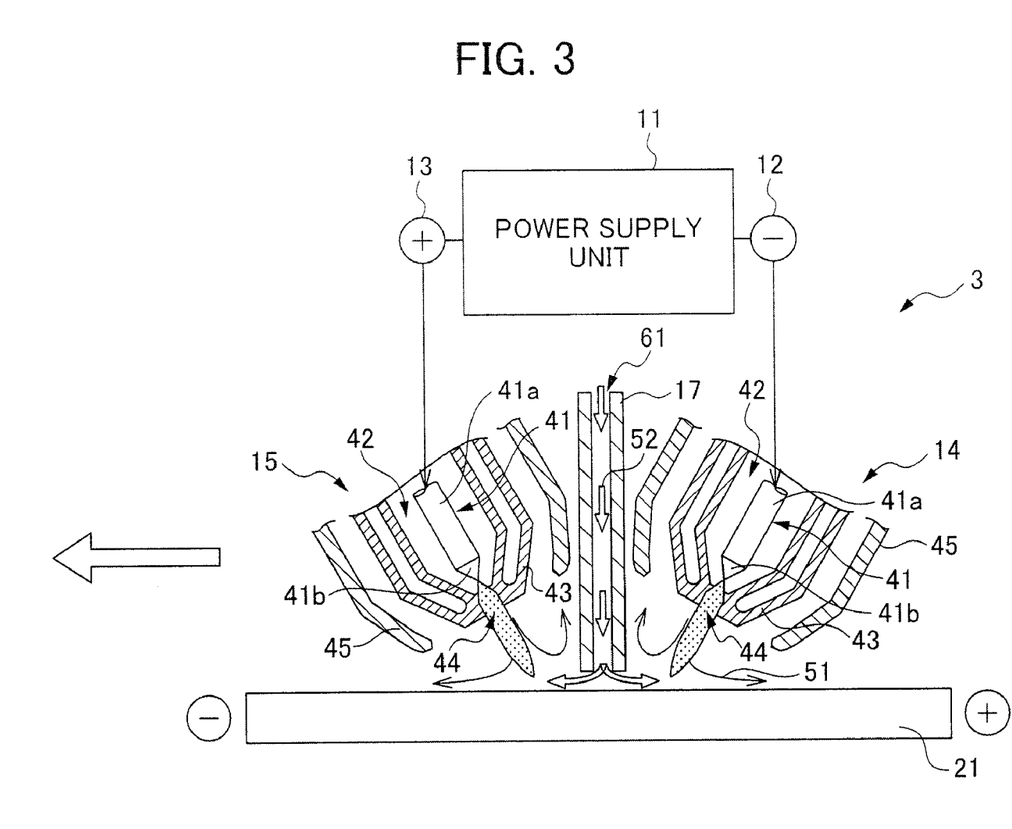
FIG. 3 is a cross-sectional view showing an outline structure of a two-electrode arc welding device according to a third embodiment of the present invention.

Specifically, FIG. 3 is a cross-sectional view showing an outline structure of the two-electrode arc welding device 3 according to the third embodiment of the present invention. It should be noted that, in FIG. 3, corresponding reference symbols are assigned to parts corresponding with FIG. 1 or 2, and explanations of these parts have been omitted as appropriate.

The two-electrode arc welding device 3 according to the third embodiment includes the power-supply unit 11, the straight-polarity output terminal 12, the reverse-polarity output terminal 13, the straight-polarity arc torch 14, and the reverse-polarity arc torch 15, similarly to the first and second embodiments. The two-electrode arc welding device 3 according to the third embodiment further has an insulating body 17 that is arranged between the electrode tip 41b of the straight-polarity arc torch 14 and the electrode tip 41b of the reverse-polarity arc torch 15 to be substantially parallel to a perpendicular line from the surface of the welding base metal 21.

A gas ejection passage 61 is formed in this insulating body 17, which is different from the insulating body 16 of the second embodiment, so as to penetrate the center inside the insulating body 17. A gas 52 supplied from a supply means that is not illustrated flows through the gas ejection passage 61 and is ejected to the welding base metal 21, whereby the plasma gas 51 is prevented from passing between the insulating body 17 and the welding base metal 21, as shown in FIG. 3. An inert gas having a low ionization tendency, such as helium, can be used as such a gas 52, for example. It should be noted that, although the gas 52 is ejected to the welding base metal 21 from the bottom of the gas ejection passage 61 in FIG. 3, this is an illustrative example. In other words, the ejection location of the gas 52 is not particularly limited to the example of FIG. 3. It may be any location so long as it is a location that allows the plasma gas 51 to be prevented from passing between the insulating body 17 and the welding base metal 21.

Operation of the two-electrode arc welding device 3 according to the third embodiment is fundamentally the same as operation according to the first and second embodiments; therefore, explanation thereof will be omitted.

As a matter of course, there are the aforementioned effects (3) to (6), as well as the following effect according to the third embodiment.

(7) The gas 52 is ejected from the gas ejection passage 61, which is provided so as to penetrate the center inside of the insulating body 17. With this, it is possible to prevent a medium having high conductivity, e.g., the plasma gas 51 or gas ir which the shielding gas used in TIG welding or the like described later is ionized, from passing between the insulating body 17 and the welding base metal 21. As a result, the arc spacing critical distance of the third embodiment is shortened more than the second embodiment (refer to FIG. 2) for a case of a medium having high conductivity being supplied at the same flow-rates. Consequently, the arc spacing distance L1 can be further shortened relative to the second embodiment without reducing the flow-rate of a medium having high conductivity, and the extent of the effect of the preheating function of the reverse-polarity arc torch 15 that is leading becomes much larger in proportion to the distance by which the arc spacing distance L1 has been shortened, whereby the penetration performance improves. Furthermore, since the arc length L2 can also be further shortened relative to the second embodiment, the penetration depth deepens in proportion to the distance by which the arc length L2 is shortened, whereby the penetration performance further improves.

It should be noted that the present invention is not to be limited to the first to third embodiments. Modifications, improvement and the like within a scope that can achieve the object of the present invention are included in the present invention. For example, although the straight-polarity arc torch 14 and the reverse-polarity arc torch 15 have been designed as plasma arc torches in the first to third embodiments, they are not limited thereto. They may be any torch so long as having a non-consumable electrode.

More specifically, although not illustrated, the straight-polarity arc torch 14 can be designed as a TIG arc torch, and the reverse-polarity arc torch 15 can be designed as a plasma arc torch, for example. A two-electrode arc welding device according to the present invention in this case (hereinafter referred to as "TIG+plasma welding device") can also assume the structure of any of the aforementioned FIGS. 1 to 3. Therefore, it is possible to exert the aforementioned effects (3) to (5) in a case of assuming the structure of FIG. 1, exert the aforementioned effects (3) to (6) in a case of assuming the structure of FIG. 2, and exert the aforementioned effects (3) to (7) in a case of assuming the structure of FIG. 3.

More specifically, the arc spacing critical distance in a case of the current of the non-consumable electrode 41 being 50 amps was 40 mm when measured by the present applicants. As a result, in a case of the TIG+plasma welding device assuming the structure of FIG. 1, arc spacing distance L1 of approximately 50 mm is used. In contrast, in a case of the TIG+plasma welding device assuming the structure of FIG. 2, it becomes possible to shorten the arc spacing distance L1 to 30 mm due to the effect of (6), and in a case of the TIG+plasma welding device assuming the structure of FIG. 3, it becomes possible to further shorten the arc spacing distance L1 to 20 mm due to the effect of (7).

In addition, for the TIG+plasma welding device having the structure of FIG. 3, when the conditions of the arc length L2 being 3 mm and the current of the non-consumable electrode 41 being 100 amps were adopted, the penetration performance improved as follows due to the aforementioned effect of (3), compared to a conventional single arc welding device under the same conditions. Specifically, in a case of the welding speed of the conventional single arc welding device being 700 mm/min, the penetration depth was 0.79 mm. In contrast, in a case of the welding speed of the TIG+plasma welding device having the structure of FIG. 3 being the same condition (700 mm/min), the penetration depth was 1.5 times the depth at 1.27 mm, and in a case of the penetration depth being substantial the same condition (0.66 mm), the welding speed was 1.4 times at 950 mm/min.

However, if considering the aforementioned effect of (5), the structure of the straight-polarity arc torch 14 and the reverse-polarity arc torch 15 are more suited to be structured as two plasma arc torches than to be structured by combining a TIG torch and a plasma arc torch. Furthermore, since the non-consumable electrode 41 of a TIG torch has a characteristic of being more rapidly consumed than the non-consumable electrode 41 of the plasma arc torch, the amperage for the case of being structured as two plasma arc torches is 150 amps according to the measurements of the present applicant, which is an improvement over the 50 amps of the aforementioned example for the case of structuring as a combination of a TIG torch and a plasma arc torch. In this way, there also exists an effect of raising the current as an effect of using plasma arc torches. However, since it has been established by measurements of the present applicant that the non-consumable electrode 41 of the reverse-polarity arc torch 15 (non-consumable electrode 41 on ground side) is rapidly consumed when the amperage is set to 150 amps or more, the non-consumable electrode 41 of the reverse-polarity arc torch 15 is suitable for less than 150 amps.

What is claimed is:

1. A two-electrode arc welding device, comprising:
a power supply that outputs a straight-polarity voltage of low electrical potential relative to a welding base metal and a reverse-polarity voltage of high electrical potential relative to the welding base metal and having a different electrical potential than the straight-polarity voltage;
a straight-polarity non-consumable electrode to which the straight-polarity voltage output from the power supply is applied, and causes an arc to form by a voltage occurring between a leading end thereof and the welding base metal; and
a reverse-polarity non-consumable electrode to which the reverse-polarity voltage output from the power supply is applied, and causes an arc to form by a voltage occurring between a leading end thereof and the welding base metal, wherein
the straight-polarity non-consumable electrode and the reverse-polarity non-consumable electrode are disposed to be separated by at least a minimum distance at which an arc will not occur therebetween, and respectively cause an arc to the welding base metal to form.

2. A two-electrode arc welding device according to claim 1, further comprising an insulating body that is disposed between the straight-polarity non-consumable electrode and the reverse-polarity non-consumable electrode.

3. A two-electrode arc welding device according to claim 2, wherein a passage through which a gas flows and is externally ejected is formed inside of the insulating body.

4. A two-electrode arc welding device according to claim 1, wherein
at least one among the straight-polarity non-consumable electrode and the reverse-polarity non-consumable electrode is a plasma arc torch.

5. A two-electrode arc welding device according to claim 1, wherein
the straight-polarity non-consumable electrode and the reverse-polarity non-consumable electrode move in a predetermined direction relative to the welding base metal, and are disposed to be aligned substantially in parallel to the predetermined direction.

6. A two-electrode arc welding device according to claim 2, wherein
at least one among the straight-polarity non-consumable electrode and the reverse-polarity non-consumable electrode is a plasma arc torch.

7. A two-electrode arc welding device according to claim 3, wherein
at least one among the straight-polarity non-consumable electrode and the reverse-polarity non-consumable electrode is a plasma arc torch.

8. A two-electrode arc welding method for a two-electrode arc welding device including: a power supply that outputs a straight-polarity voltage of low electrical potential relative to a welding base metal and a reverse-polarity voltage of high electrical potential relative to the welding base metal and having a different electrical potential than the straight-polarity voltage; a straight-polarity non-consumable electrode to which the straight-polarity voltage output from the power supply is applied, and causes an arc to form by a voltage occurring between a leading end thereof and the welding base metal; and a reverse-polarity non-consumable electrode to which the reverse-polarity voltage output from the power supply is applied, and causes an arc to form by a voltage occurring between a leading end thereof and the welding base metal,
the method comprising
a step of causing the straight-polarity non-consumable electrode and the reverse-polarity non-consumable electrode to respectively form an arc to the welding base metal in a state separated by at least a minimum distance at which an arc will not occur therebetween.

9. A two-electrode arc welding method according to claim 8, wherein
the two-electrode arc welding device further includes an insulating body disposed between the straight-polarity non-consumable electrode and the reverse-polarity non-consumable electrode.

10. A two-electrode arc welding method according to claim 9, wherein
a passage through which a gas flows and is externally ejected is formed inside of the insulating body.

11. A two-electrode arc welding method according to claim 8, wherein at least one among the straight-polarity non-consumable electrode and the reverse-polarity non-consumable electrode is a plasma arc torch.

12. A two-electrode arc welding method according to claim 8, wherein the straight-polarity non-consumable electrode and the reverse-polarity non-consumable electrode move in a predetermined direction relative to the welding base metal, and are disposed to be aligned substantially in parallel to the predetermined direction.

13. A two-electrode arc welding method according to claim 9, wherein at least one among the straight-polarity non-consumable electrode and the reverse-polarity non-consumable electrode is a plasma arc torch.

14. A two-electrode arc welding method according to claim 10, wherein at least one among the straight-polarity non-consumable electrode and the reverse-polarity non-consumable electrode is a plasma arc torch.

* * * * *